(12) United States Patent
Yu et al.

(10) Patent No.: US 6,442,437 B1
(45) Date of Patent: Aug. 27, 2002

(54) METHOD FOR STEP MOTOR CONTROL

(75) Inventors: Yuan-Tong Yu, Hsin Chien Li; John Lin, Hsinchu, both of (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/338,230

(22) Filed: Jun. 22, 1999

(51) Int. Cl.$^7$ .............................................. G05B 13/02
(52) U.S. Cl. ......................... 700/28; 700/32; 318/696; 368/474; 396/236; 708/235; 708/200
(58) Field of Search ................................. 700/170, 304, 700/306, 28–30; 396/236; 708/235; 358/474; 235/470; 318/696, 685

(56) References Cited

U.S. PATENT DOCUMENTS

| | | | | |
|---|---|---|---|---|
| 4,156,170 A | * | 5/1979 | Strunc | 318/696 |
| 4,811,052 A | * | 3/1989 | Yamakawa et al. | 355/14 |
| 5,488,274 A | * | 1/1996 | Satoh | 318/101 |
| 6,144,914 A | * | 11/2000 | Davis et al. | 701/104 |
| 6,259,172 B1 | * | 7/2001 | Lee | 307/125 |
| 6,275,747 B1 | * | 8/2001 | Wada et al. | 700/266 |

* cited by examiner

Primary Examiner—Thomas Black
Assistant Examiner—Crystal J Barnes
(74) Attorney, Agent, or Firm—Christensen O'Connor; Johnson Kindness PLLC

(57) ABSTRACT

When the driver of a step motor is executed in a personal computer, its speed will be varied in response to the speed of the CPU. To provide a constant and stable speed of the step motor, the present invention automatically detects the system model and the CPU model of the personal computer when the host computer is power-on. In addition, the present invention establishes a lookup table which records a proper delay times for a corresponding system model and CPU model. After obtaining the CPU model and the system model, the proper delay times can be found by looking up the lookup table. The delay times obtained can be provided for the delay subroutine for the driver, thereby to update the delay parameter required for the delay subroutine. Consequently, the speed of the step motor will be automatically updated in response to the system performance of a personal computer to guarantee a smooth and stable stepping motion for a step motor.

9 Claims, 1 Drawing Sheet

| CPU SPEED | DELAY TIMES |
|---|---|
| PENTIUM 100 | N |
| PENTIUM 133 | N + 10 |
| PENTIUM 166 | N + 20 |
| PENTIUM 200 | N + 30 |
| PENTIUM 233 | N + 40 |
| ⋮ | ⋮ |
| ⋮ | ⋮ |

METHOD FOR STEP MOTOR CONTROL

BACKGROUND OF THE INVENTION

A. Field of the Invention

The present invention relates to a method for controlling the speed of a step motor, especially to a method which can automatically adjust the speed of a step motor by providing an auto-detected delay parameter to a delay subroutine.

B. Description of the Prior Art

The step motor control involves in controlling the stepping motion of a step motor, especially the torque and the delay time for each step. The conventional step motor control can be either hardware-based or software-based. The hardware-based step motor control incorporates an integrated circuit in the machine for speed control. On the other hand, the software-based step motor control is implemented as a driver executable on a host computer.

The step motor control is very essential especially for a cooperated machine that demands high accuracy. For instance, in the application of a line image scanner which requires the original or the optical elements to be driven by the step motor, the speed of the step motor will determine the vertical resolution of the image. The stepping motion of the original must be carried out with accuracy if a faithful and complete representation of the original image is to be captured. Once the step motor is driven in nonuniform speed, the image will be distorted. To provide a smooth and uniform motion, the driver will call a delay subroutine for providing a proper delay time interval between two steps, so that each step will have enough time to generate sufficient torque for a subsequent step. If the delay time interval is too long or too short, the torque may be insufficient to drive a step of motor and cause a nonuniform acceleration in high speed.

Since the delay time interval determines the stability of the step motor, some driver developers use the fastest computer system model and CPU model as the standard reference value when testing the stability of the step motor. Others may use a CPU interrupt subroutine to generate a static delay time interval. For either approach, the delay parameter for the delay times of a conventional delay subroutine is always static regardless of the platform that is running the driver. The problems occur when the user runs the driver on a personal computer which has a different speed with the testing platform. For instance, if the driver is run by a CPU which is faster than the testing platform, then the step motor will skip steps or even halt. On the other hand, if the driver is run by a low speed CPU, then the speed of the step motor may be slowed down. The reason is that if the delay time interval is static, the machine cycle will be shorter, the number of delay times shall also be increased. However, the conventional approaches cannot automatically adjust the delay time interval in response to the actual speed of the CPU run by the platform. In the worst case, the step motor may produce nonuniform acceleration, or even halt.

SUMMARY OF THE INVENTION

Accordingly, it is an object of the present invention to provide a method for automatically adjusting the speed of a step motor by updating its delay parameter of a delay subroutine according to a system model and CPU model of the platform, thereby to keep the uniform acceleration and smooth movement of the step motor.

In accordance with the present invention, the present invention builds a lookup table for recording the currently available system model, CPU model, and corresponding delay times. Whenever the system is power-on, the step-motor driver will be enabled. The step-motor driver will automatically detect the computer system model and CPU model of the host computer. After finding the computer system model and CPU model, the proper corresponding delay times can be found by looking up the lookup table. The proper delay times found can be provided as the delay parameter for the delay subroutine of the driver. Consequently, the speed of the step motor can be well controlled according to the system model and CPU model of the computer that is actually running the driver.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figures 1, 2:
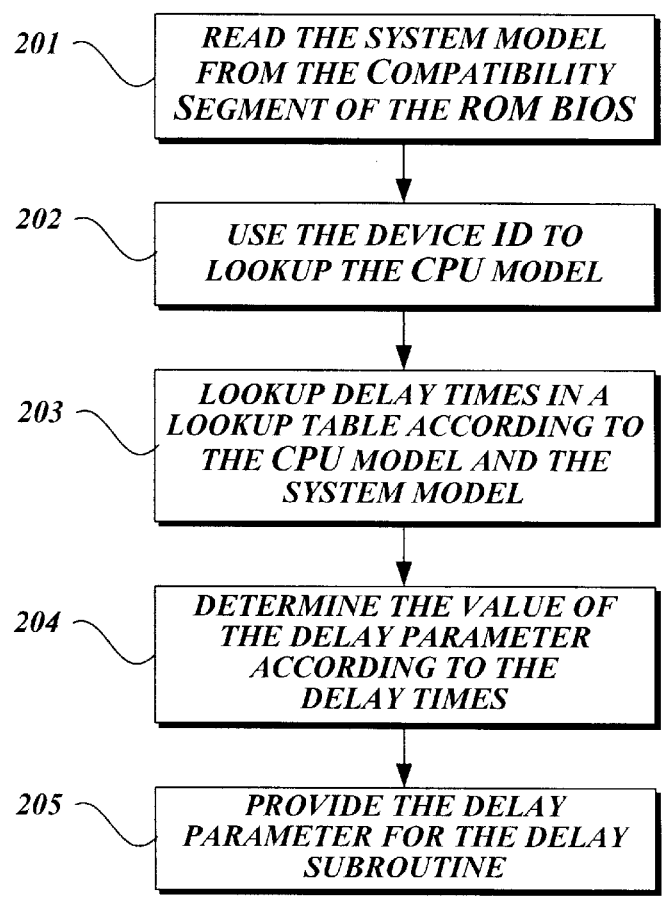
FIG. 1 is a schematic diagram showing the lookup table according to the preferred embodiment of the present invention.
FIG. 2 is a flowchart showing the method of the present invention.

A preferred embodiment of the invention is described below. This embodiment is merely exemplary. Those skilled in the art will appreciate that changes can be made to the disclosed embodiment without departing from the spirit and scope of the invention.

To solve the problems mentioned above, the driver must be able to update its delay parameter according to the system model and CPU model of the platform that is actually running the driver. The proper delay time interval and the number of proper delay times can be computed according to a current computer system model and CPU model. Accordingly, the method of the present invention can be illustrated hereinafter:

For personal computers, especially IBM compatible computers, the system model and CPU model can be obtained from the system BIOS. Accordingly, the present invention uses a software subroutine to detect the computer system model and the CPU model. For instance, the Compatibility Segment (COMPAS) of the ROM BIOS provides each entry point for each interrupt subroutine and the addresses for each table. Accordingly, the system model can be obtained from the address FFFF:000E of the Compatibility Segment of the ROM BIOS.

On the other hand, the CPU model of a personal computer can be detected by another subroutine. Usually after the system is reset or power-on, the microprocessor will be loaded with a Device ID in DH (data register high bytes) and a Stepping ID in DL (data register low bytes). The BIOS code that is responsible for these data will store the device ID for the software to retrieve. For instance, Intel Pentium processor will add the new CPU ID instruction in the CPU for the software program to access. From the known hardware device ID, its speed and corresponding data can be easily found.

So, if the system model and the CPU model can be found, we can compute the proper delay times for each combination of CPU model and computer system model. Then, build a lookup table for storing each available system model, CPU model and the corresponding delay times as illustrated in FIG. 1. For IBM compatible computers, the lookup table mainly includes the CPU speed, and the corresponding delay times. For instance, on a Pentium 100 host computer, the proper delay times N can be computed and set as the default delay times for the step motor . On a Pentium 133 host computer, since the CPU speed is faster, so the delay times shall be increased under the condition that the delay time interval is static. Accordingly, the proper delay times is 10(times)+N. The same scenario follows for the rest records of the table. After the lookup table is established, the step-motor driver can detect the system model and the CPU model first, then use the system model and the CPU model to find the corresponding delay times. Then, provide the delay times as the delay parameter for the delay subroutine. Consequently, the step motion of the step motor can remain stable by updating its delay parameter according to the performance of the platform that is running the driver.

The inventive method can be illustrated more clearly from FIG. 2:

201: When the driver is enabled, read the computer system model from the Compatibility Segment of the ROM BIOS.
202: Find the CPU model from the device ID.
203: Lookup a lookup table according to the computer system model and the CPU model found in step 201 and 202.
204: Determine the delay parameter according to the number of delay times.
205: Provide a delay parameter for the delay subroutine.

The step motor control method of the present invention can be widely applied to many applications that run the driver of the step motor on a host computer. In most cases, the step motor control of a scanner can apply the control method of the present invention to guarantee the quality of the images.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for controlling a step motor in a computer system having a scanner, comprising the steps of:

reading a computer system model and a central process unit (CPU) model while a driver of said step motor is enabled;

looking up a corresponding delay time from a lookup table according to said computer system model and said CPU model; and providing said corresponding delay time to a delay subroutine to drive said step motor at a uniform speed while reading image information from said scanner.

2. The method as claimed in claim 1, wherein said computer system model can be found in a compatibility section of a ROM BIOS.

3. The method as claimed in claim 1, wherein said CPU model can be found when said system is reset.

4. The method as claimed in claim 1, wherein said CPU model can be found when said system is power-on.

5. The method as claimed in claim 1, further comprising the steps of:

computing a delay time according to a computer system model, and a CPU model; and establishing said lookup table according to said computer system model, said CPU model and said delay time.

6. A method for controlling a step motor in a computer system having a scanner, comprising the steps of:

establishing a lookup table, said lookup table comprising a plurality of computer system models, CPU models, and delay times; reading a computer system model and a central process unit (CPU) model while a driver of said step motor is enabled;

looking up corresponding delay times from said lookup table according to said computer system model and said CPU model; and providing said corresponding delay times to a delay subroutine to drive said step motor at a uniform speed while reading image information from said scanner.

7. The method as claimed in claim 6, wherein said computer system model can be found in a compatibility section of a ROM BIOS.

8. The method as claimed in claim 6, wherein said CPU model can be found when said system is reset.

9. The method as claimed in claim 6, wherein said CPU model can be found when said system is power-on.

* * * * *